(12) United States Patent
Pujar et al.

(10) Patent No.: US 11,765,193 B2
(45) Date of Patent: Sep. 19, 2023

(54) CONTEXTUAL EMBEDDINGS FOR IMPROVING STATIC ANALYZER OUTPUT

(71) Applicant: International Business Machines Corporation, Armonk, NY (US)

(72) Inventors: Saurabh Pujar, White Plains, NY (US); Luca Buratti, White Plains, NY (US); Alessandro Morari, New York, NY (US); Jim Alain Laredo, Katonah, NY (US); Mihaela Ancuta Bornea, White Plains, NY (US); Jeffrey Scott McCarley, Bedford Hills, NY (US); Yunhui Zheng, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 17/138,408

(22) Filed: Dec. 30, 2020

(65) Prior Publication Data

US 2022/0210178 A1 Jun. 30, 2022

(51) Int. Cl.
*H04L 9/40* (2022.01)
*G06F 8/51* (2018.01)
*G06F 18/24* (2023.01)
*G06F 18/214* (2023.01)

(52) U.S. Cl.
CPC ............ *H04L 63/1433* (2013.01); *G06F 8/51* (2013.01); *G06F 18/2155* (2023.01); *G06F 18/24* (2023.01); *H04L 63/20* (2013.01)

(58) Field of Classification Search
CPC ....... H04L 63/1433; H04L 63/20; G06F 8/51; G06K 9/6259; G06K 9/6267

USPC ......................................................... 726/25
See application file for complete search history.

(56) References Cited

U.S. PATENT DOCUMENTS

| | | | |
|---|---|---|---|
| 8,806,441 | B2 | 8/2014 | Chandra |
| 10,002,064 | B2 | 6/2018 | Muske |
| 10,394,687 | B2 | 8/2019 | Yoon |
| 10,558,554 | B2 | 2/2020 | Bhandarkar |
| 10,705,795 | B2 | 7/2020 | Podder |
| 10,713,145 | B2 | 7/2020 | Anaya |
| 10,740,216 | B1 | 8/2020 | Parent |

(Continued)

FOREIGN PATENT DOCUMENTS

| | | | |
|---|---|---|---|
| EP | 3144816 A1 | 3/2017 | |
| JP | 2008171397 A | * 7/2008 | ........... G06F 16/951 |

OTHER PUBLICATIONS

"A tool to detect bugs in Java and C/C++/Objective-C code before it ships", Copyright © 2020 Facebook, Inc., 5 pages, <https://fbinfer.com/>.

(Continued)

*Primary Examiner* — Abiy Getachew
*Assistant Examiner* — Aubrey H Wyszynski
(74) *Attorney, Agent, or Firm* — Gavin Giraud

(57) ABSTRACT

In a computer-implemented method for improving a static analyzer output, a processor receives a labeled data set with labeled true vulnerabilities and labeled false vulnerabilities. A processor receives pretrained contextual embeddings from a contextual embeddings model. A processor maps the true vulnerabilities and the false vulnerabilities to the pretrained contextual embeddings model. A processor generates a fine-tuned model with classifications for true vulnerabilities.

20 Claims, 4 Drawing Sheets

(56) References Cited

U.S. PATENT DOCUMENTS

| | | | |
|---|---|---|---|
| 11,620,515 B2* | 4/2023 | Liu | G06F 40/40 706/45 |
| 2013/0145215 A1 | 6/2013 | Pistoia | |
| 2014/0075560 A1* | 3/2014 | Guy | G06F 21/577 726/25 |
| 2015/0363294 A1* | 12/2015 | Carback, III | G06F 8/75 717/132 |
| 2018/0150742 A1 | 5/2018 | Woulfe | |
| 2018/0276562 A1 | 9/2018 | Woulfe | |
| 2019/0222490 A1 | 7/2019 | Mallah | |
| 2019/0250911 A1* | 8/2019 | Lospinuso | G06F 8/75 |
| 2020/0065220 A1 | 2/2020 | Sobran | |
| 2020/0073784 A1 | 3/2020 | Cheng | |
| 2020/0097387 A1 | 3/2020 | Loyola | |
| 2021/0217408 A1* | 7/2021 | Hakkani-Tur | G06F 40/284 |
| 2022/0093088 A1* | 3/2022 | Rangarajan Sridhar | G06F 16/338 |
| 2022/0197961 A1* | 6/2022 | Baek | G06N 20/00 |
| 2022/0286475 A1* | 9/2022 | Mullaney | G06K 9/6256 |

OTHER PUBLICATIONS

Lee et al., "Classifying False Positive Static Checker Alarms in Continuous Integration Using Convolutional Neural Networks", Downloaded Oct. 26, 2020, 11 pages.

Devlin et al., "BERT: Pre-training of Deep Bidirectional Transformers for Language Understanding", arXiv:1810.04805v2 [cs.CL] May 24, 2019, 16 pages.

Flynn, Lori, "Prioritizing Alerts from Static Analysis to Find and Fix Code Flaws", Jun. 6, 2016 • Sei Blog, 7 pages, <https://insights.sei.cmu.edu/sei_blog/2016/06/prioritizing-alerts-from-static-analysis-to-find-and-fix-code-flaws.html>.

Li et al., "Improving Bug Detection Via Context-Based Code Representation Learning and Attention-Based Neural Networks", Proc. ACM Program. Lang., vol. 3, No. OOPSLA, Article 162. Publication date: Oct. 2019, 30 pages, <https://doi.org/10.1145/3360588>.

Anonymous Authors, "Pre-Trained Contextual Embedding of Source Code", Under review as a conference paper at ICLR 2020, 20 pages.

Ribeiro et al., "Ranking Warning From Multiple Source Code Static Analyzers Via Ensemble Learning", OpenSym 19, Aug. 20-22, 2019, Skövde, Sweden, 10 pages, <https://doi.org/10.1145/3306446.3340828>.

Karampatsis et al., "SCELMo: Source Code Embeddings From Language Models", http://arxiv.org/abs/2004.13214v1, 12 pages.

Tripp et al., "Aletheia: Improving the Usability of Static Security Analysis", CCS'14, Nov. 3-7, 2014, Copyright 2014 ACM, 13 pages.

* cited by examiner

CONTEXTUAL EMBEDDINGS FOR IMPROVING STATIC ANALYZER OUTPUT

BACKGROUND

The present invention relates generally to the field of static program analysis, and more particularly to using contextual embeddings to improve over static analyzer outputs and reduce false identification of vulnerabilities.

Static program analysis is the analysis of computer software that is performed without executing the computer software in a program. The analysis of the computer software can be performed on source code or object code. Static program analysis, performed by automated static analyzers, can be checked by human review of the results. This human analysis is known as program understanding, program comprehension, or code review. Static analyzers are increasingly used to complement conventional dynamic testing, where the program is executed and analyzed. Static program analysis often includes false vulnerabilities, which makes reviewing the labeled vulnerabilities less useful. Also, existing static analyzers require familiarity with tool functions and controls (e.g., setup process, configurations, terminology), adversely impacting the number of people willing to use static analyzers.

SUMMARY

Aspects of embodiments of the present invention disclose a computer-implemented method, a computer program product, and a computer system for improving static analyzer output. A processor receives a labeled data set with labeled true vulnerabilities and labeled false vulnerabilities. A processor receives pretrained contextual embeddings from a contextual embeddings model. A processor maps the true vulnerabilities and the false vulnerabilities to the pretrained contextual embeddings model. A processor generates a fine-tuned model with classifications for true vulnerabilities.

DETAILED DESCRIPTION

The disclosed embodiments include devices and methods for generating a fine-tuned static analysis model that decreases the number of falsely labeled vulnerabilities in a body of source code, which increases the speed at which the source code may be reviewed and developed. The systems and methods disclosed herein may be used on source code that is written for any program or written in any programming language. Additionally, any previously developed static analyzer may be used to initially analyze the source code and generate an output data set that is further tuned by the embodiments disclosed herein. The output data set of the static analyzers includes a list of vulnerabilities in the source code that could potentially cause bugs or problems when the source code is executed. Since static analyzers simplify the source code in order to deal with the complexity inherent to many source code projects, the static analyzers often label vulnerabilities falsely. Therefore, the output from current static analyzers requires further review to determine whether each labeled vulnerability actually poses a problem to the source code. The embodiments disclosed herein use contextual embeddings to associate correctly labeled true vulnerabilities with specific contexts in the source code. These contexts are included in a fine-tuned model that can be used to identify true vulnerabilities in new static analyzer outputs.

Figure 1:
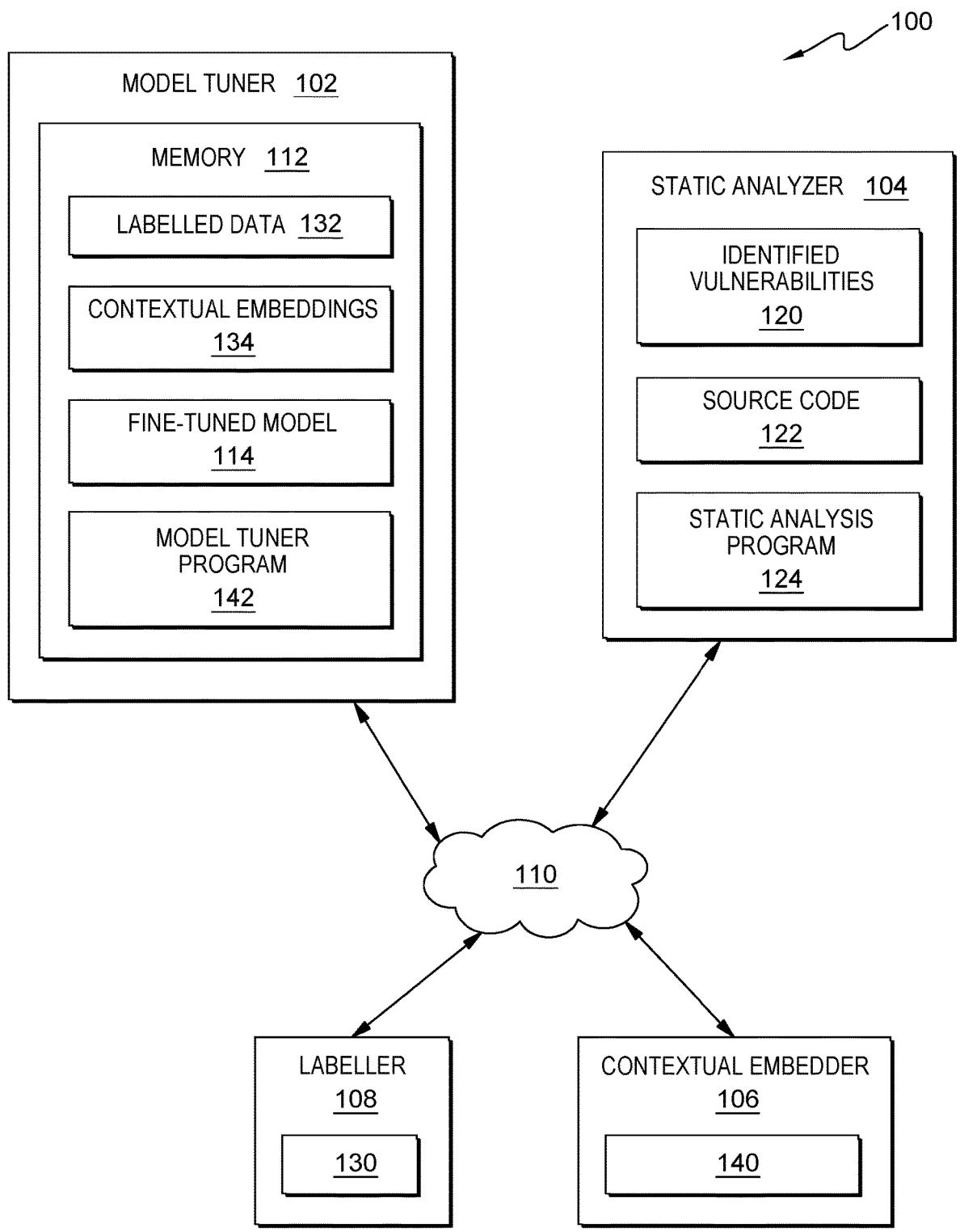
FIG. 1 is a functional block diagram illustrating a static analysis training system, in accordance with an embodiment of the present invention.

Turning now to the drawings, FIG. 1 depicts a diagram of a static analysis tuning system 100 in accordance with one embodiment of the present invention. FIG. 1 provides only an illustration of one embodiment and does not imply any limitations with regard to the environments in which different embodiments may be implemented.

The system 100 includes a model tuner 102, a plurality of static analyzers 104, a contextual embedding trainer 106, and a vulnerabilities labeler 108. In certain embodiments, as illustrated, the model tuner 102, the plurality of static analyzers 104, the contextual embedding trainer 106, and the vulnerabilities labeler 108 are communicatively coupled via a communication network 110. The communication network 110 may include a local area network (LAN), a wide area network (WAN) such as the Internet, any combination thereof, or any combination of connections and protocols that will support communications between the model tuner 102, the plurality of static analyzers 104, the contextual embedding trainer 106, and the vulnerabilities labeler 108 in accordance with embodiments of the invention. The communication network 110 may include wired, wireless, or fiber optic connections. In certain embodiments, the model tuner 102, the plurality of static analyzers 104, the contextual embedding trainer 106, and the vulnerabilities labeler 108 may exist on a single computer as virtual devices without diverging from the disclosed embodiments.

In certain embodiments, one or more of the model tuner 102, the static analyzers 104, the contextual embedding trainer 106, and the vulnerabilities labeler 108 may include memory 112 for storing digital information. In the illustrated embodiment of FIG. 1, the memory 112 is shown only as part of the model tuner 102. The memory 112 may include read-only memory ("ROM"), random access memory ("RAM") (e.g., dynamic RAM ("DRAM"), synchronous DRAM ("SDRAM"), and the like), electrically erasable programmable read-only memory ("EEPROM"), resistive RAM ("RRAM"), flash memory, a hard disk, a secure digital ("SD") card, other suitable memory devices, or a combination thereof. The memory 112 includes information processed and sent from the static analyzers 104, the contextual embedding trainer 106, and the vulnerabilities labeler 108 to generate a fine-tuned model 114 according to the method provided in FIG. 2.

Before the model tuner 102 is able to generate the fine-tuned model 114, however, the static analysis tuning system 100 generates information first at the static analyzers 104. Specifically, the static analyzers 104 generate identified vulnerabilities data sets 120 by analyzing source code 122 with a static analysis program 124. The source code 122 may be written for any type of software or firmware project in any variety of applications or coding languages. At any point in the development of the source code 122, it may be sent to the static analyzers 104, where the static analysis program 124 analyzes the source code 122 to find vulnerabilities in the source code 122. In the field of static analysis, terms such as vulnerabilities, defects, bugs, errors, and issues are often used interchangeably despite having technically independent definitions. As used herein, the term "vulnerability/vulnerabilities" refers to any warning from a static analyzer that would indicate a problem or undesired condition in the source code 122, including any issues that may be referred to as defects, bugs, errors, and/or issues. Identifying vulnerabilities may include routing a code analysis request to a set of one or more static code analysis tools based on a context of the request. The static code analysis tools may include, for example, unit level, technology level, system level, or business level tools that use techniques such as abstract interpretation, data-flow analysis, Hoare logic, model checking, and symbolic execution to generate and/or detect the vulnerabilities or bugs.

Further development of the source code 122 may include reviewing and correcting the vulnerabilities in the identified vulnerabilities data sets 120. In order to catch all the vulnerabilities in the source code 122, however, the static analysis programs 124 often over-identify. That is, of the identified vulnerabilities 120, most do not actually cause a problem in the source code 122. In fact, some instances of static analysis, when reviewed, showed that less than ten percent of the labeled vulnerabilities turned out to be true vulnerabilities. The list of identified vulnerabilities 120 should thus be reduced, without removing any of the vulnerabilities that will cause a problem in the source code 122.

The fine-tuned model for reducing the false vulnerabilities of the identified vulnerabilities 120 is performed by the model tuner 102, which is trained using a labeled data set 124 generated by the vulnerabilities labeler 108. Specifically, the vulnerabilities labeler 108 includes a labeling program 130 that creates a labeled data set 132 that is received by the model tuner 102 (block 202, FIG. 2). The labeled data set 132 may also be labeled by hand, by a reviewer looking over the identified vulnerabilities data sets 120. Reviewing the identified vulnerabilities data sets 120 may include reviewing each individual vulnerability and making a determination as to whether it will in fact cause a problem when executing the source code 122. Vulnerabilities in the identified vulnerabilities data sets 120 that do not actually cause a problem in the source code 122 are labeled "false vulnerabilities" in the labeled data set 132, while the vulnerabilities in the identified vulnerabilities data sets 120 that do actually cause a problem are labeled as "true vulnerabilities" in the labeled data set 132.

The model tuner 102 also uses information for a contextual embedder 106 to generate the fine-tuned model 112. The contextual embedder 106 includes a contextual embedder model 140 that generates pretrained contextual embeddings 134 that are received by the model tuner 102 (block 204, FIG. 2) and may be stored on the memory 112. Contextual embeddings are a special type of "embedding," which are vector representations for a token (e.g., a word in a text). Embeddings include vectors of many dimensions that enable a comparison (e.g., cross product) to other vectors to determine relationships between the underlying tokens. Some embeddings (e.g., word embeddings) assign a vector to a token that is the same regardless of the usage of the token. For example, the word embedding for "book" will be the same for "I am reading a book" and "did you book a hotel room?" Word Embeddings don't differentiate between the two meanings.

Contextual embeddings, on the other hand, assign different vector representations depending on the surrounding context in which the token is used. The contextual embedder model 140 builds contextual embeddings of a token by evaluating the context and weighing the relationship for the token and its context. Transformers are one model type that uses attention to understand the relationships between tokens and the context, and build contextual embeddings for every token. Models of contextual embeddings can be dependent, therefore, on the inputs and training the model with different inputs generates different contextual vector representations. The mapping may be done by neural networks, dimensionality reductions on the token co-occurrence matrix, probabilistic models, explainable knowledge base methods, and explicit representation in terms of the context in which words appear. The contextual embedder model 140 may include software such as, ELMo and BERT. The contextual embedder model 140 may develop the classifications for the pretrained contextual embeddings 134 based on the source code 122, or other source code related to the program and/or the language of the source code 122. Furthermore, the contextual embedder model 140 may develop the pretrained contextual embeddings 134 based on comments (e.g., textbooks, reference materials) related to the source code 122. For example, if the source code 122 is related to a program that will be used in the finance industry, then the contextual embedder model 140 may develop the pretrained contextual embeddings 134 based on financial document, articles, papers, or other references.

The results of the contextual embedder model 140 are pretrained contextual embeddings 134 that have vectors representing words or phrases that could be present in the source code 122. A classic example, for illustrative purposes, is that the vectors representing "king"–"man"+ "woman" should be approximately equal to "queen." The vectors in the pretrained contextual embeddings 134 may be represented in many dimensions, with the real values for each of the variables being hidden within the contextual embedder model 140.

Figure 2:
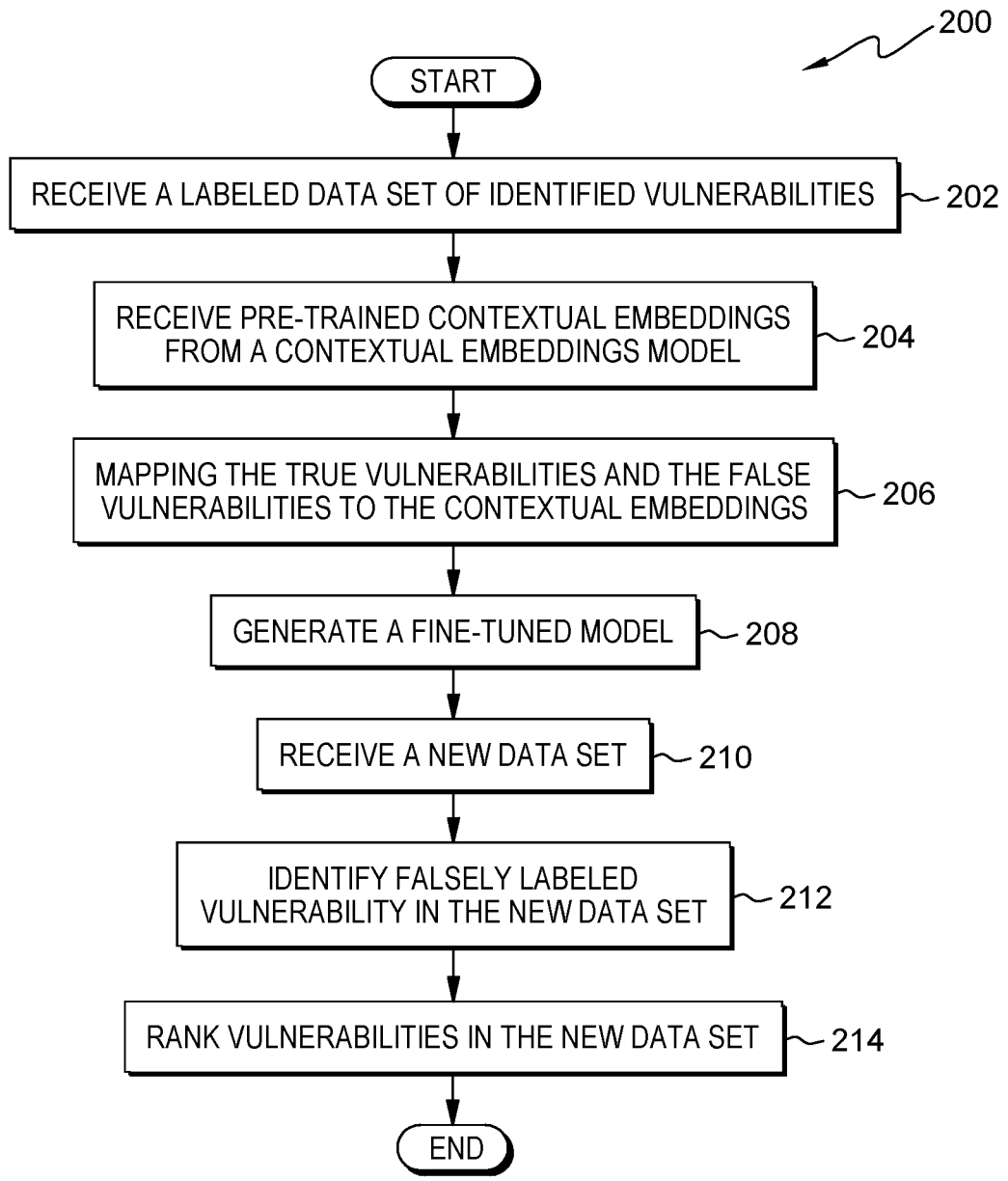
FIG. 2 is a flowchart depicting operational steps of a static analyzer training program, in accordance with an embodiment of the present invention.

With the labelled data 132 and the pretrained contextual embeddings 134 generated within the static analysis tuning system 100, the model tuner 102 runs a model tuner program 142 that can include the method disclosed in FIG. 2. The model tuner program 142 receives the labeled data 132, which, as described above, includes labeled true vulnerabilities and labeled false vulnerabilities (block 202). The model tuner program 142 also receives the pretrained contextual embeddings 134 (block 204). The model tuner program 142 then compares the true vulnerabilities and the false vulnerabilities to the pretrained contextual embeddings 134 (block 206). For example, the model tuner program 142 may perform a dot product of the true vulnerabilities as mapped within the pretrained contextual embeddings 134 with the false vulnerabilities as mapped within the pretrained contextual embeddings 134.

Figure 3:
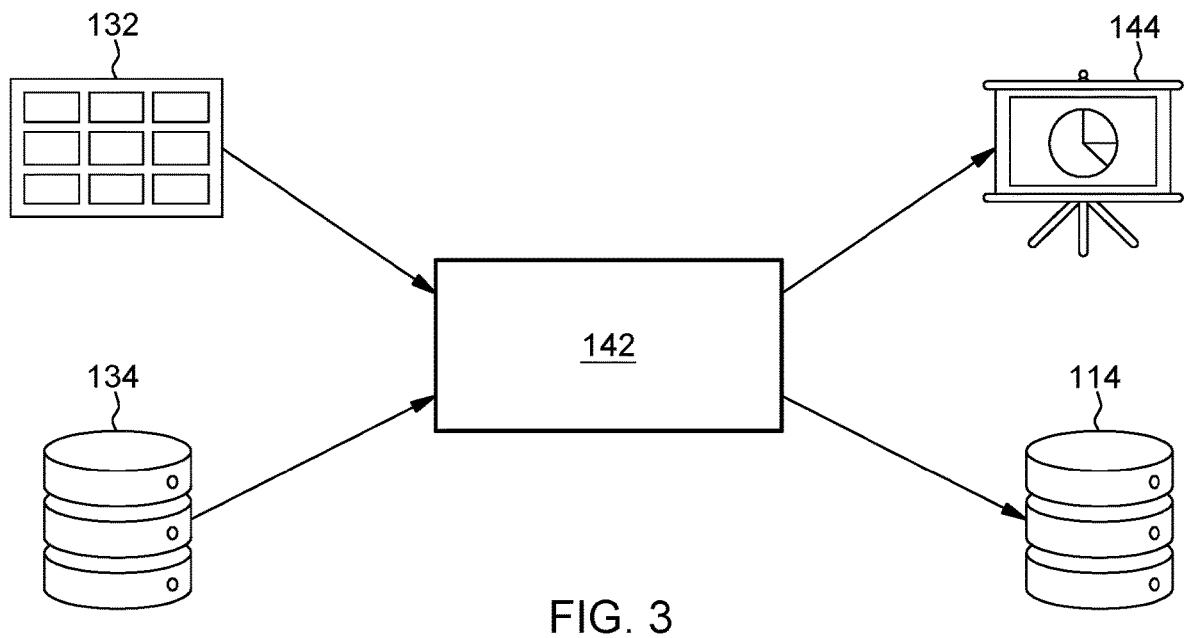
FIG. 3 is a schematic depiction of operational steps of the model tuner program in training, in accordance with an embodiment of the present invention.

FIG. 3 is a schematic depiction of operational steps of the model tuner program 142 being trained, in accordance with an embodiment of the present invention. The model tuner program 142 receives the labeled data 132 and the pretrained contextual embeddings 134. The model tuner program 142 is then trained by mapping the labeled data 132 and the pretrained contextual embeddings 134 to generate the fine-tuned model 114 (block 208). That is, the model tuner program 142 runs the contextual embeddings model 140 with the labeled data 132, with the result being the fine-tuned model 114. The training process may also include training results 144 that have vectors for each of the false vulnerabilities and true vulnerabilities that were included in the labeled data set 132. The fine-tuned model 114 may include updated classifications for determining whether an identified vulnerability is actually a true vulnerability. Specifically, the fine-tuned model 114 may include a model for binary classification of vulnerabilities, in which an identified vulnerability is compared to the fine-tuned model and is given a "yes" or "no" indication as to whether it is a true vulnerability. The fine-tuned model 114 may also include a model for multi-class classification of the vulnerabilities, in which the identified vulnerability is assigned a specific type of vulnerability. For example, the fine-tuned model 114 may indicate whether a vulnerability is likely due to a typographical error, a faulty syntax, a security vulnerability, or some other weakness in the source code 122. The fine-tuned model 114 may also include a model for ranking the likelihood that the vulnerabilities are false vulnerabilities.

Figure 4:
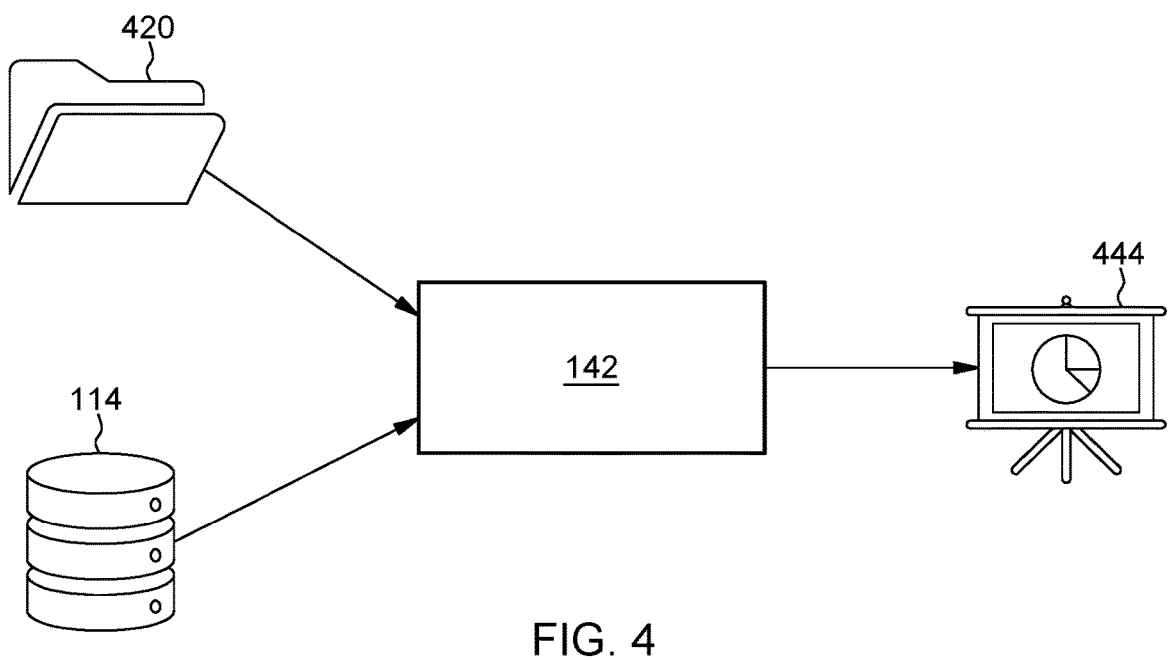
FIG. 4 is a schematic depiction of operational steps of the model tuner program identifying vulnerabilities, in accordance with an embodiment of the present invention.

FIG. 4 is a schematic depiction of operational steps of the model tuner program 142, in accordance with an embodiment of the present invention. After generation of the fine-tuned model 114, the model tuner program 142 may receive a new identified vulnerabilities data set 420 with vulnerabilities identified and labeled by a static analyzer 104 (block 210). The model tuner program 142 may also generate tuned results 444 that identify falsely labeled vulnerabilities in the new data set (block 212). Specifically, once trained, the model tuner program 142 may be able to receive the new identified vulnerabilities data set 420 and identify, using the fine-tuned model 114, a falsely labeled vulnerability in the new data set 420. Additionally or alternatively, embodiments of the model tuner program 142 may be able to receive the new identified vulnerabilities data set 420 and rank, using the fine-tuned model 114, the vulnerabilities in the new data set 420 (block 214). The ranking by the model tuner program 142 may correspond to a likelihood that each vulnerability is a true vulnerability or a false vulnerability. Additionally or alternatively, embodiments of the model tuner program 142 may be able to receive the new identified vulnerabilities data set 420 and classify, using the fine-tuned model 114, the vulnerabilities in the new data set 420. The classification corresponds to a type of vulnerability.

Figure 5:
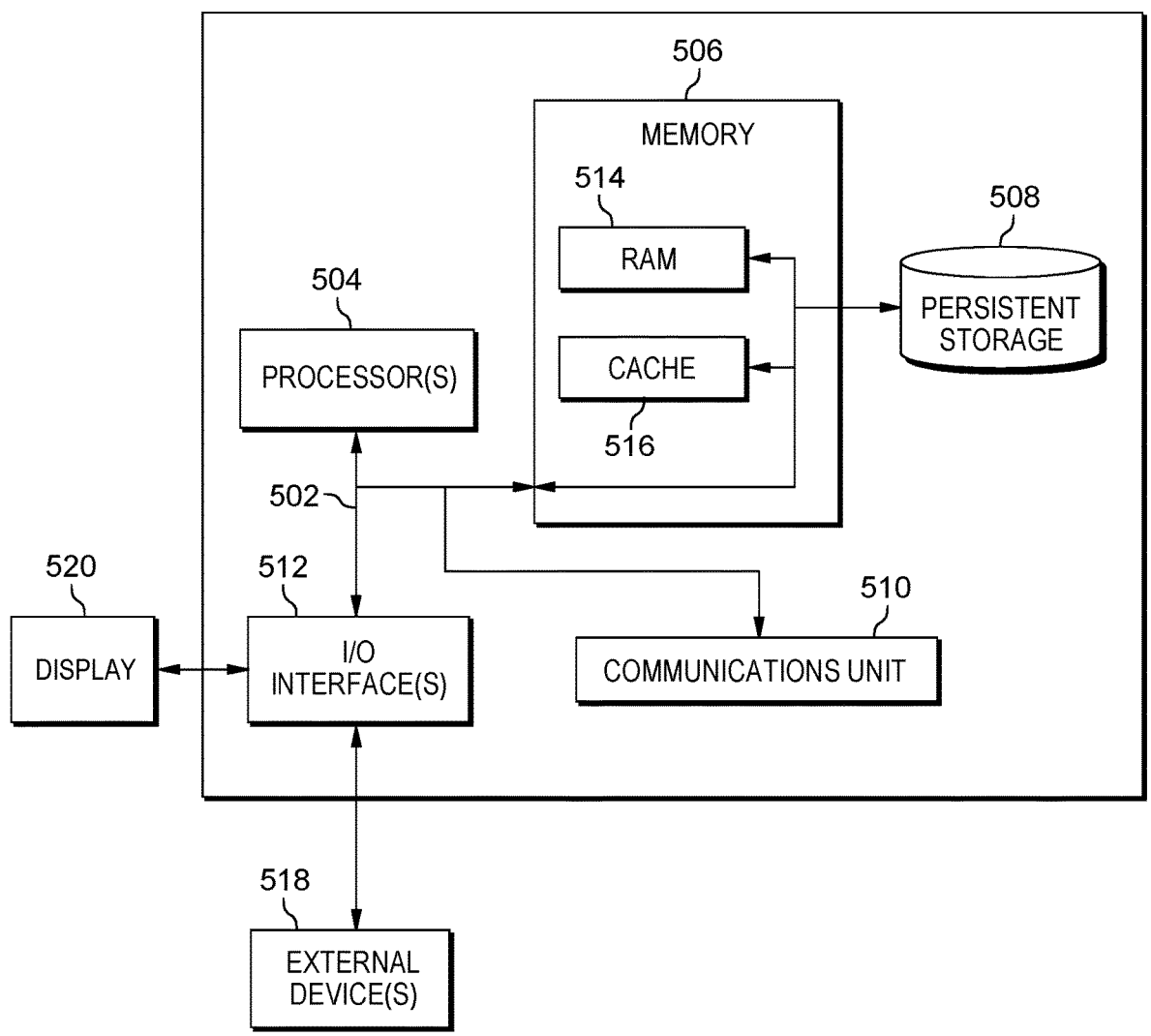
FIG. 5 is a block diagram of components of the computer executing the static analyzer program, in accordance with an embodiment of the present invention.

FIG. 5 depicts a block diagram of components of one or more of the model tuner 102, the static analyzers 104, the contextual embedding trainer 106, and the vulnerabilities labeler 108 in accordance with an illustrative embodiment of the present invention. Each of the model tuner 102, the static analyzers 104, the contextual embedding trainer 106, and the vulnerabilities labeler 108 may be embodied on a separate device, or each of the model tuner 102, the static analyzers 104, the contextual embedding trainer 106, and the vulnerabilities labeler 108 may be embodied on the same device having the components shown in FIG. 5. It should be appreciated that FIG. 5 provides only an illustration of one implementation and does not imply any limitations with regard to the environments in which different embodiments may be implemented. Many modifications to the depicted environment may be made.

The model tuner 102, the static analyzers 104, the contextual embedding trainer 106, and the vulnerabilities labeler 108 may include communications fabric 502, which provides communications between RAM 514, cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

The static analysis programs 124, the labeling program 130, and the model tuner program 142 may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. The static analysis programs 124, the labeling program 130, and the model tuner program 142 may be downloaded to persistent storage 508 through communications unit 510.

I/O interface(s) 512 allows for input and output of data with other devices that may be connected to server computer. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention (e.g., the static analysis programs 124, the labeling program 130, and the model tuner program 142) can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for improving static analyzer output, comprising:
receiving, by one or more processors, a labeled data set comprising labeled true vulnerabilities and labeled false vulnerabilities of a static analyzer output;
receiving pretrained contextual embeddings from a contextual embeddings model, wherein the pretrained contextual embeddings comprise vector representations for tokens used in written material related to the static analyzer;
mapping first tokens of the true vulnerabilities and second tokens of the false vulnerabilities as vector representations based on the pretrained contextual embeddings; and
generating a fine-tuned model comprising classifications for true vulnerabilities from tokens in new static analyzer outputs.

2. The method of claim 1, comprising:
receiving a new data set comprising vulnerabilities labeled by a static analyzer; and
identifying, using the fine-tuned model, a falsely labeled vulnerability in the new data set.

3. The method of claim 1, comprising:
receiving a new data set comprising vulnerabilities labeled by a static analyzer; and
ranking, using the fine-tuned model, the vulnerabilities in the new data set, wherein the ranking corresponds to a likelihood that each vulnerability is a true vulnerability or a false vulnerability.

4. The method of claim 1, comprising:
receiving a new data set comprising vulnerabilities labeled by a static analyzer; and
classifying, using the fine-tuned model, the vulnerabilities in the new data set, wherein the classification corresponds to a type of vulnerability.

5. The method of claim 1, wherein the contextual embeddings comprise classifications generated from algorithms trained using source code.

6. The method of claim 5, wherein the contextual embeddings comprise classifications generated from algorithms trained using comments related to the source code.

7. The method of claim 1, wherein the fine-tuned model comprises a selection from the group consisting of a first model for binary classification of vulnerabilities, a second model for multi-class classification of the vulnerabilities, and a third model for ranking the likelihood that the vulnerabilities are false vulnerabilities.

8. The method of claim 1, wherein the true vulnerabilities and the false vulnerabilities are manually labeled.

9. A computer program product comprising:
one or more computer readable storage media, and program instructions collectively stored on the one or more computer readable storage media, the program instructions comprising:
instructions to receive, at one or more processors, a labeled data set comprising labeled true vulnerabilities and labeled false vulnerabilities of the static analyzer output;
instructions to receive pretrained contextual embeddings from a contextual embeddings model, wherein the pretrained contextual embeddings comprise vector representations for tokens used in written material related to the static analyzer;
instructions to map first tokens of the true vulnerabilities and second tokens of the false vulnerabilities as vector representations based on the pretrained contextual embeddings model; and
instructions to generate a fine-tuned model comprising classifications for true vulnerabilities from tokens in new static analyzer outputs.

10. The computer program product of claim 9, comprising:
instructions to receive a new data set comprising vulnerabilities labeled by a static analyzer; and
instructions to identify, using the fine-tuned model, a falsely labeled vulnerability in the new data set.

11. The computer program product of claim 9, comprising:
instructions to receive a new data set comprising vulnerabilities labeled by a static analyzer; and
instructions to rank, using the fine-tuned model, the vulnerabilities in the new data set, wherein the ranking corresponds to a likelihood that each vulnerability is a true vulnerability or a false vulnerability.

12. The computer program product of claim 9, comprising:
instructions to receive a new data set comprising vulnerabilities labeled by a static analyzer; and
instructions to classify, using the fine-tuned model, the vulnerabilities in the new data set, wherein the classification corresponds to a type of vulnerability.

13. The computer program product of claim 9, wherein the contextual embeddings comprise classifications generated from algorithms trained using source code.

14. The computer program product of claim 13, wherein the contextual embeddings comprise classifications generated from algorithms trained using comments related to the source code.

15. The computer program product of claim 9, wherein the fine-tuned model comprises a selection from the group consisting of a model for binary classification of vulnerabilities, a model for multi-class classification of the vulnerabilities, and a model for ranking the likelihood that the vulnerabilities are false vulnerabilities.

16. The computer program product of claim 9, wherein the true vulnerabilities and the false vulnerabilities are manually labeled.

17. A computer system comprising:
one or more computer processors, one or more computer readable storage media, and program instructions collectively stored on the one or more computer readable storage media for execution by at least one of the one or more computer processors, the program instructions comprising:
instructions to receive, at one or more processors, a labeled data set comprising labeled true vulnerabilities and labeled false vulnerabilities of the static analyzer output;
instructions to receive pretrained contextual embeddings from a contextual embeddings model, wherein the pretrained contextual embeddings comprise vector representations for tokens used in written material related to the static analyzer;
instructions to map first tokens of the true vulnerabilities and second tokens of the false vulnerabilities as vector representations based on the pretrained contextual embeddings model; and instructions to generate a fine-tuned model comprising classifications for true vulnerabilities from tokens in new static analyzer outputs.

18. The computer system of claim 17, comprising:

instructions to receive a new data set comprising vulnerabilities labeled by a static analyzer; and instructions to identify, using the fine-tuned model, a falsely labeled vulnerability in the new data set.

19. The computer system of claim 17, comprising:

instructions to receive a new data set comprising vulnerabilities labeled by a static analyzer; and instructions to rank, using the fine-tuned model, the vulnerabilities in the new data set, wherein the ranking corresponds to a likelihood that each vulnerability is a true vulnerability or a false vulnerability.

20. The computer system of claim 17, comprising:

instructions to receive a new data set comprising vulnerabilities labeled by a static analyzer; and instructions to classify, using the fine-tuned model, the vulnerabilities in the new data set, wherein the classification corresponds to a type of vulnerability.

\* \* \* \* \*